(12) United States Patent
Ohiwa et al.

(10) Patent No.: US 11,105,072 B2
(45) Date of Patent: Aug. 31, 2021

(54) WORK VEHICLE AND DISPLAY CONTROL METHOD

(71) Applicant: KOMATSU LTD., Tokyo (JP)

(72) Inventors: Kenji Ohiwa, Tokyo (JP); Masao Yamamura, Tokyo (JP); Tomohiro Nakagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 391 days.

(21) Appl. No.: 16/061,458

(22) PCT Filed: Nov. 29, 2016

(86) PCT No.: PCT/JP2016/085346
§ 371 (c)(1),
(2) Date: Jun. 12, 2018

(87) PCT Pub. No.: WO2017/110381
PCT Pub. Date: Jun. 29, 2017

(65) Prior Publication Data
US 2020/0263395 A1      Aug. 20, 2020

(30) Foreign Application Priority Data

Dec. 25, 2015 (JP) .............................. JP2015-253703

(51) Int. Cl.
*E02F 9/26* (2006.01)
*B60K 35/00* (2006.01)
*E02F 9/16* (2006.01)

(52) U.S. Cl.
CPC .............. *E02F 9/264* (2013.01); *B60K 35/00* (2013.01); *E02F 9/16* (2013.01); *E02F 9/261* (2013.01);
(Continued)

(58) Field of Classification Search
CPC ... G02F 9/26; G02F 9/264; G02F 3/32; G06T 7/248; E02F 9/264; E02F 9/16;
(Continued)

(56) References Cited

U.S. PATENT DOCUMENTS

2007/0296646 A1    12/2007  Yamamoto et al.
2014/0100712 A1*    4/2014  Nomura ................. E02F 9/264
                                                                701/1
(Continued)

FOREIGN PATENT DOCUMENTS

CN        101098491 A     1/2008
CN        102339204 A     2/2012
(Continued)

*Primary Examiner* — Ig T An
(74) *Attorney, Agent, or Firm* — Faegre Drinker Biddle & Reath LLP

(57) ABSTRACT

A work vehicle includes: a display device provided in a cab and configured to display work assistance information to be overlaid on an actual view of a work site; a bucket position detector configured to detect a position of a bucket; and a display controller configured to control a content to be displayed on the display device and configured to cause the work assistance information to be displayed around the bucket while causing the work assistance information to follow the movement of the bucket based on the detected position. When work assistance information becomes close to a boundary of a display area of the display device due to the movement of the bucket, the display controller is configured to cause the work assistance information to be displayed on the display device with a relative position between the work assistance information and the bucket in the display area being changed.

11 Claims, 11 Drawing Sheets

(52) U.S. Cl.
CPC .. *B60K 2370/152* (2019.05); *B60K 2370/177* (2019.05); *B60K 2370/61* (2019.05)

(58) Field of Classification Search
CPC ... E02F 9/261; B60K 35/00; B60K 2370/177; B60K 2370/152; B60K 2370/61
See application file for complete search history.

(56) References Cited

U.S. PATENT DOCUMENTS

| | | |
|---|---|---|
| 2015/0218781 A1 | 8/2015 | Nomura et al. |
| 2015/0376868 A1* | 12/2015 | Jackson ................ E02F 9/2029 701/50 |
| 2016/0024757 A1 | 1/2016 | Nomura et al. |
| 2016/0193920 A1* | 7/2016 | Tsubone .................. E02F 9/16 701/36 |

FOREIGN PATENT DOCUMENTS

| | | |
|---|---|---|
| CN | 104619925 A | 5/2015 |
| CN | 104884713 A | 9/2015 |
| JP | 2005-162154 A | 6/2005 |
| JP | 2009-166624 A | 7/2009 |
| JP | 2009-243073 A | 10/2009 |
| JP | 5113586 B2 | 1/2013 |
| JP | 2014-129676 A | 7/2014 |
| JP | 2014-205955 A | 10/2014 |
| KR | 10-2015-0082601 A | 7/2015 |

\* cited by examiner

WORK VEHICLE AND DISPLAY CONTROL METHOD

TECHNICAL FIELD

The present invention relates to a work vehicle and a display control method, particularly, a work vehicle having a bucket and a display control method in the work vehicle.

BACKGROUND ART

Conventionally, a work vehicle such as a hydraulic excavator has been known. Such a work vehicle has a main body and a work implement connected to the main body. For example, a work implement of a hydraulic excavator has a boom, a dipper stick, and a bucket in the stated order as seen on the side of the main body.

Japanese Patent Laying-Open No. 2009-243073 (Patent Document 1) discloses a hydraulic excavator as an example of a work vehicle. The hydraulic excavator includes a cab, a work implement, a display device, and a display position processor. The work implement is operated as manipulated by an operator in the cab. The display device is provided in the cab and displays a predetermined image. The display position processor changes the display position of the image in the display device in response to a movement of the work implement.

Particularly, the display device is a transparent display provided at the front surface of the cab. Among display positions, the display position processor causes a predetermined image to be displayed at a position that crosses a straight line that connects the distal end of the work implement to a viewpoint of the operator in the cab.

CITATION LIST

Patent Document

PTD 1: Japanese Patent Laying-Open No. 2009-243073

SUMMARY OF INVENTION

Technical Problem

A display area of the display device provided at the front surface of the cab is limited to the range of the front surface. Hence, it is considered that in the work vehicle provided with the display device at the front surface of the cab thereof, a display position of a predetermined image such as work assistance information may be unable to be caused to follow the distal end of the work implement. Therefore, in order to improve operability of the work vehicle, it is expected to develop a work vehicle that can handle such a situation.

The present invention has been made in view of the above-described problem, and has an object to provide a work vehicle that can improve operability of the work vehicle by appropriately controlling displaying of work assistance information, as well as a display control method in the work vehicle.

Solution to Problem

According to an aspect of the present invention, a work vehicle includes: a work implement having a bucket; a main body to which the work implement is attached, the main body having a cab; a display device provided in the cab and configured to display work assistance information to be overlaid on an actual view of a work site; a bucket position detector configured to detect a position of the bucket; and a display controller configured to control a content to be displayed on the display device, and configured to cause the work assistance information to be displayed around the bucket while causing the work assistance information to follow a movement of the bucket based on the detected position. When the work assistance information becomes close to a boundary of a display area of the display device due to the movement of the bucket, the display controller is configured to cause the work assistance information to be displayed on the display device with a relative position between the work assistance information and the bucket in the display area being changed.

According to the above-described configuration, when the work assistance information becomes close to the boundary of the display area of the display device, the work assistance information is displayed with the relative position between the work assistance information and the bucket being changed, whereby the work assistance information can continue to be securely displayed. Hence, the operability of the work vehicle can be improved. Further, the operability of the work vehicle can be improved as compared with a configuration in which the work assistance information is not displayed around bucket 7.

Preferably, the display controller is configured to: cause a plurality of pieces of the work assistance information to be displayed on the display device in a predetermined arrangement; and change the arrangement of the plurality of pieces of the work assistance information when at least one of the plurality of pieces of the work assistance information becomes close to the boundary due to the movement of the bucket.

According to the above-described configuration, even when there is work assistance information that cannot follow the movement of the bucket, the work assistance information can continue to be displayed.

Preferably, the display controller is configured to control a display position of the work assistance information on the display device such that the work assistance information is visually recognized at a left position or a right position relative to the bucket when viewed from the cab.

According to the above-described configuration, the work assistance information is not displayed at least below the teeth. Therefore, displaying can be performed with excellent workability for the operator.

Preferably, the bucket is movable in a frontward direction and a rearward direction relative to the cab. When the work assistance information becomes close to the boundary due to the movement of the bucket in the rearward direction, the display controller is configured to cause the work assistance information displayed at one of the right position and the left position to be displayed at the other of the right position and the left position.

According to the above-described configuration, even when the bucket becomes close to the cab, the display position of the work assistance information can be caused to follow the bucket.

Preferably, the work implement is provided at a right side relative to the cab. The one of the right position and the left position is the right position. The other of the right position and the left position is the left position.

According to the above-described configuration, the work assistance information can be displayed in a manner suitable in view of the attachment position of the work implement to the main body.

Preferably, the bucket is movable in an upward direction and a downward direction relative to the cab. When the work assistance information becomes close to the boundary due to the movement of the bucket in the upward direction, the display controller is configured to change the relative position between the work assistance information and the bucket at an upper end area of the display area.

According to the above-described configuration, the work assistance information is displayed at the same or close position as or to the position at which the work assistance information has been displayed just before the work assistance information cannot follow the movement of the bucket. Hence, as compared with a case of displaying the work assistance information at a different position, displaying can be performed with excellent convenience for the operator.

Preferably, the bucket is movable in an upward direction and a downward direction relative to the cab. When the work assistance information becomes close to the boundary due to the movement of the bucket in the downward direction, the display controller is configured to change the relative position between the work assistance information and the bucket at a lower end area of the display area.

According to the above-described configuration, the work assistance information is displayed at the same or close position as or to the position at which the work assistance information has been displayed just before the work assistance information cannot follow the movement of the bucket. Hence, as compared with a case of displaying the work assistance information at a different position, displaying can be performed with excellent convenience for the operator.

According to another aspect of the present invention, a work vehicle includes: a work implement having a bucket; a main body to which the work implement is attached, the main body having a cab; a display device provided in the cab and configured to display work assistance information to be overlaid on an actual view of a work site; a bucket position detector configured to detect a position of the bucket; and a display controller configured to control a content to be displayed on the display device, and configured to cause the work assistance information to be displayed around the bucket while causing the work assistance information to follow a movement of the bucket based on the detected position. When the work assistance information becomes close to a boundary of a display area of the display device due to the movement of the bucket, the display controller is configured to stop displaying the work assistance information.

According to the above-described configuration, by stopping displaying the work assistance information when the work assistance information becomes close to the boundary of the display area of the display device, the operator can visually recognize a front view clearly. Hence, the operability of the work vehicle can be improved. Further, the operability of the work vehicle can be improved as compared with a configuration in which the work assistance information is not displayed around the bucket.

Preferably, the display controller is configured to cause a plurality of pieces of the work assistance information to be displayed on the display device. When the plurality of pieces of the work assistance information becomes close to the boundary due to the movement of the bucket, the display controller is configured to stop displaying at least one of the plurality of pieces of the work assistance information.

According to the above-described configuration, work assistance information, other than the at least one piece of work assistance information, from the plurality of pieces of the assistance information can be caused to follow the movement of the bucket.

Preferably, based on the detected position, the display controller is configured to determine whether or not the work assistance information becomes close to the boundary.

According to the above-described configuration, it can be determined whether or not the work assistance information becomes close to the boundary.

Preferably, based on a display position of the work assistance information, the display controller is configured to determine whether or not the work assistance information becomes close to the boundary.

According to the above-described configuration, it can be determined whether or not the work assistance information becomes close to the boundary.

Preferably, based on a position of an intersection between the display area and an imaginary line that connects the detected position to a reference position representing a viewpoint of an operator, the display controller is configured to determine whether or not the work assistance information becomes close to the boundary.

According to the above-described configuration, it can be determined whether or not the work assistance information becomes close to the boundary.

According to still another aspect of the present invention, a display control method is performed in a work vehicle including: a work implement having a bucket; a main body to which the work implement is attached, the main body having a cab; and a display device provided in the cab and configured to display work assistance information to be overlaid on an actual view of a work site. The display control method includes: detecting a position of the bucket; and displaying the work assistance information around the bucket while causing the work assistance information to follow a movement of the bucket based on the detected position, and changing a relative position between the work assistance information and the bucket in a display area of the display device when the work assistance information becomes close to a boundary of the display area.

According to the above-described configuration, when the work assistance information becomes close to the boundary of the display area of the display device, the work assistance information is displayed with the relative position between the work assistance information and the bucket being changed, whereby the work assistance information can continue to be securely displayed. Therefore, according to the above-described display control method, the operability of the work vehicle can be improved. Further, the operability of the work vehicle can be improved as compared with a configuration in which the work assistance information is not displayed around the bucket.

According to yet another aspect of the present invention, a display control method is performed in a work vehicle including: a work implement having a bucket; a main body to which the work implement is attached, the main body having a cab; and a display device provided in the cab and configured to display work assistance information to be overlaid on an actual view of a work site. The display control method includes: detecting a position of the bucket; and displaying the work assistance information around the bucket while causing the work assistance information to follow a movement of the bucket based on the detected position, and stopping displaying the work assistance information when the work assistance information becomes close to a boundary of a display area of the display device.

According to the above-described configuration, by stopping displaying the work assistance information when the work assistance information becomes close to the boundary of the display area of the display device, the operator can visually recognize a front view clearly. Therefore, according to the above-described display control method, the operability of the work vehicle can be improved. Further, the operability of the work vehicle can be improved as compared with a configuration in which the work assistance information is not displayed around the bucket.

Advantageous Effects of Invention

According to the above-described configuration, since the displaying of the work assistance information can be appropriately controlled, the operability of the work vehicle can be improved.

DESCRIPTION OF EMBODIMENTS

The present invention will now be described in an embodiment hereinafter with reference to the drawings. In the following description, identical components are identically denoted. Their names and functions are also identical. Accordingly, they will not be described repeatedly.

A. General Configuration

Figure 1:
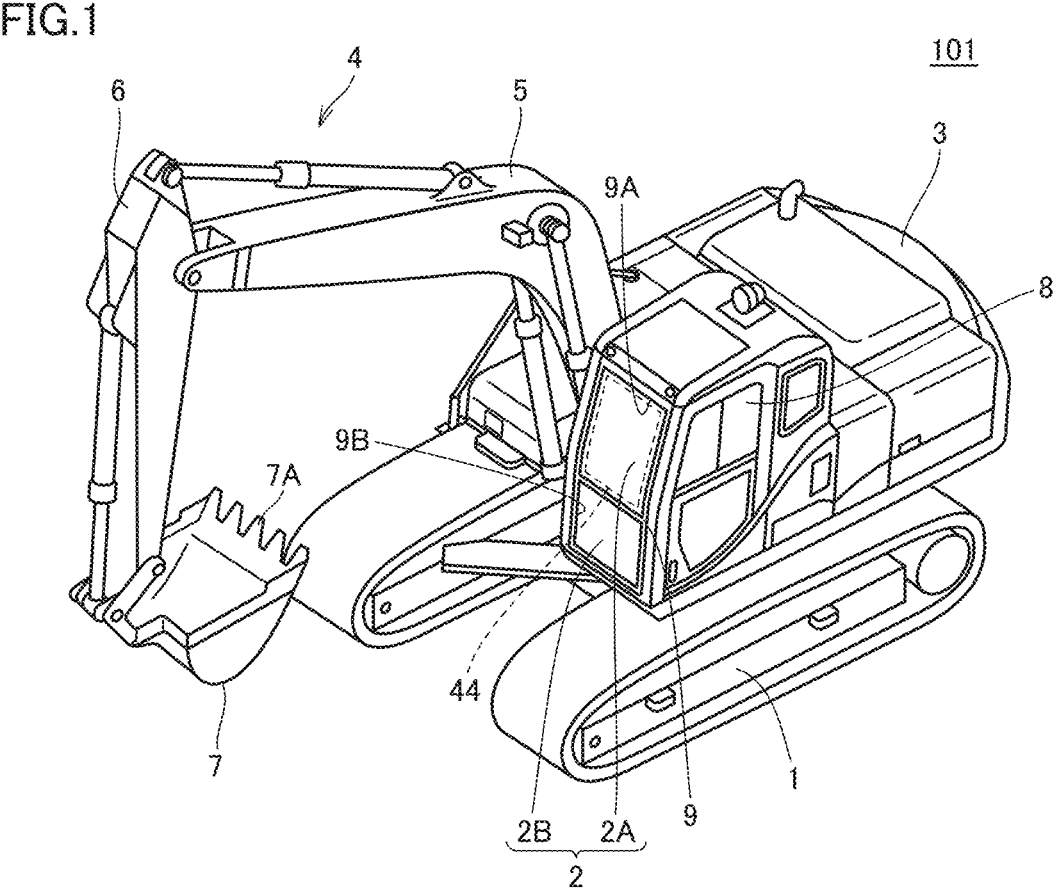
FIG. 1 illustrates an external appearance of a work vehicle according to an embodiment.

FIG. 1 is a diagram for illustrating an appearance of a work vehicle 101 according to an embodiment. In the present example, a hydraulic excavator will be described as an example of work vehicle 101 according to the embodiment as shown in FIG. 1.

Work vehicle 101 mainly includes a travel unit 1, a revolving unit 3, and a work implement 4. Work vehicle 101 has a main body composed of travel unit 1 and revolving unit 3. The main body has work implement 4 attached thereto. Travel unit 1 has a pair of right and left crawler belts. Revolving unit 3 is revolvably mounted via an upper revolving mechanism of travel unit 1. Revolving unit 3 has a cab 8 and the like.

Work implement 4 is pivotally supported at revolving unit 3 so as to be movable upward and downward and performs a work such as excavation of soil. Work implement 4 includes a boom 5, a dipper stick 6, and a bucket 7. Work implement 4 is provided at a right side relative to cab 8.

Boom 5 has a base movably coupled to revolving unit 3. Dipper stick 6 is movably coupled to the distal end of boom 5. Bucket 7 is movably coupled to the distal end of dipper stick 6. Bucket 7 is movable upward and downward relative to cab 8. Further, bucket 7 is also movable frontward and rearward relative to cab 8. Bucket 7 has teeth 7A.

Cab 8 has a front windshield 2. Front windshield 2 is fixed by a frame 9. Particularly, front windshield 2 is constituted of a front windshield 2A and a front windshield 2B located below front windshield 2A. More particularly, front windshield 2A is provided inside an upper opening frame 9A (inside the opening frame), and front windshield 2B is provided inside a lower opening frame 9B.

Display device 44 is attached in front of an operator's seat in cab 8 of work vehicle 101. In the present embodiment, display device 44 is composed of a member (a film or the like) which transmits external light incident on cab 8, and a projection device (projector). The projection device projects an image which is in turn displayed as a real image on the member (such as a film) that transmits external light. Display device 44 has a display area provided inside opening frame 9A provided on a front surface of cab 8 of work vehicle 101. The operator in cab 8 can visually observe an actual view of a work site including work implement 4 through the display area of display device 44. Display device 44 overlays on the actual view of the work site and thus display information for assisting the operator to manipulate work implement 4 (hereinafter also referred to as a work) (hereinafter also referred to as work assistance information). Display device 44 functions as a head-up display that directly displays an image in the field of view of the operator.

The member that transmits external light, such as a film, of display device 44 is placed on front windshield 2A. Display device 44 has a display extending to reach an edge of front windshield 2A. Front windshield 2A may be the same as or different from the display area of display device 44 in size.

While in the present embodiment, as display device 44, a configuration will be described in which an image projected by a projection device (projector) is displayed on a member (such as a film) that transmits external light incident on cab 8, this is not exclusive, and it is also possible to have a configuration including display device 44 which is a transparent display (for example, a transmission type liquid crystal display).

B. Configuration of Control System

Figure 2:
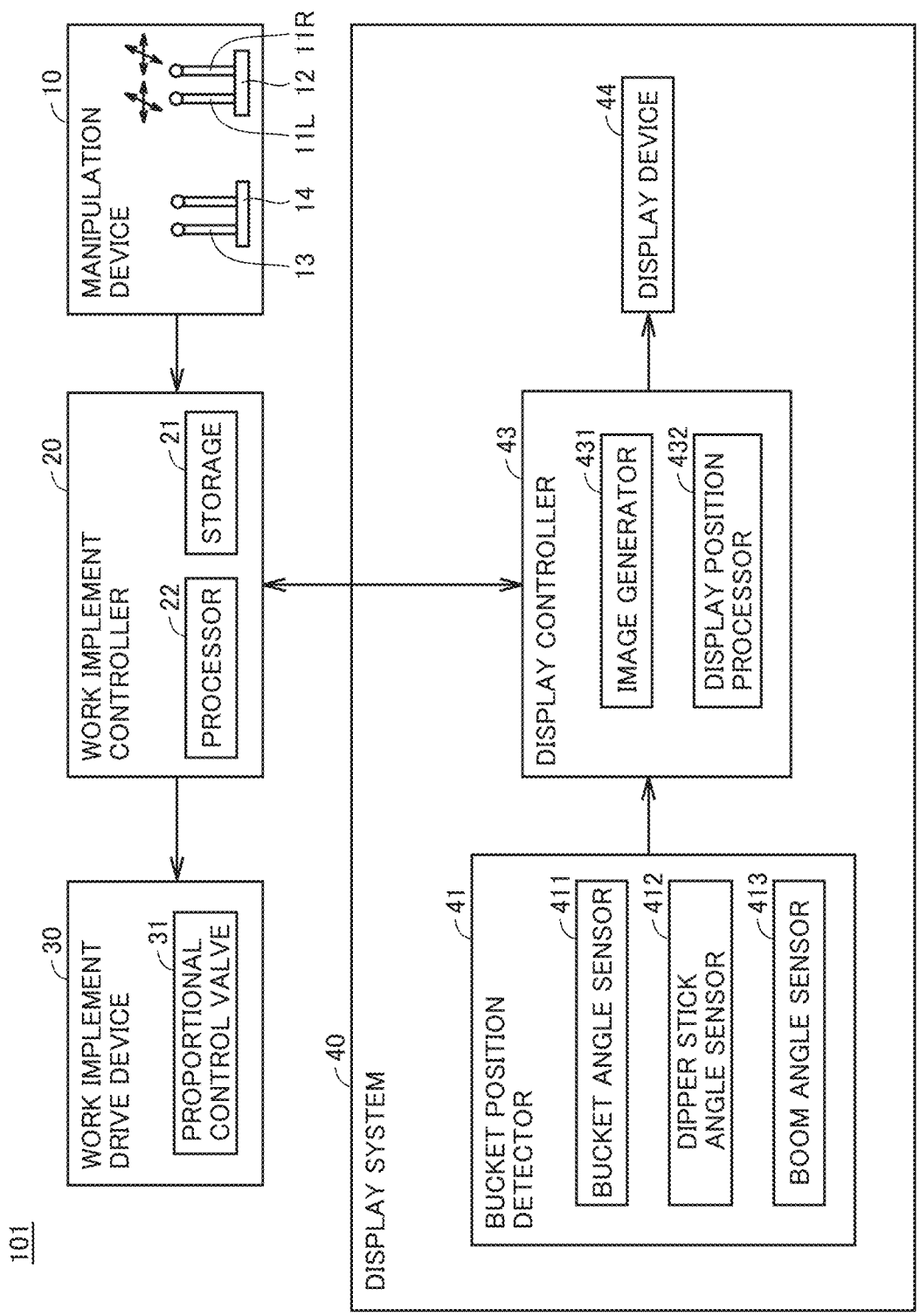
FIG. 2 is a block diagram showing a configuration of a control system included in the work vehicle.

FIG. 2 is a block diagram showing a configuration of a control system included in work vehicle 101. As shown in FIG. 2, work vehicle 101 includes a manipulation device 10, a work implement controller 20, a work implement drive device 30, and a display system 40.

b1. Manipulation Device 10

Manipulation device 10 includes manipulation members 11L and 11R, a manipulation detector 12, a travel manipulation member 13, and a travel manipulation detector 14.

Manipulation members 11L and 11R are used by the operator to manipulate work implement 4 and revolving unit 3. Specifically, manipulation member 11R is used by the operator to manipulate boom 5 and bucket 7. Manipulation member 11L is used by the operator to manipulate revolving unit 3 and dipper stick 6.

Manipulation detector 12 detects manipulations performed by the operator to manipulation members 11L and 11R.

Travel manipulation member 13 is used by the operator to control traveling of work vehicle 101. Travel manipulation detector 14 detects a pilot flow rate according to content of control done via travel manipulation member 13. Work vehicle 101 moves at a speed corresponding to the pilot flow rate.

b2. Work Implement Controller 20

Work implement controller 20 includes a storage 21 and a processor 22. Storage 21 is composed of memory such as RAM (Random Access Memory) and ROM (Read Only Memory). Processor 22 is composed of a processing device such as a CPU (Central Processing Unit).

Work implement controller 20 mainly controls the operation of work implement 4 and the revolution of revolving unit 3. Particularly, work implement controller 20 generates a control signal for operating work implement 4 and revolving unit 3 in response to manipulations of manipulation members 11L and 11R. Work implement controller 20 outputs the generated control signal to a work implement control device 27.

b3. Work Implement Drive Device 30

Work implement drive device 30 has a proportional control valve 31. Proportional control valve 31 operates based on a control signal issued from work implement controller 20. Particularly, proportional control valve 31 supplies a hydraulic cylinder and a revolution motor with hydraulic oil at a flow rate corresponding to the control signal. As a result, work implement 4 operates and revolving unit 3 revolves.

b4. Display System 40

Display device 44 of display system 40 displays various types of images such as work assistance information. Display system 40 includes a bucket position detector 41, a display controller 43, and display device 44. In display system 40, a predetermined reference position is preset as a viewpoint position for the operator.

Bucket position detector 41 includes a bucket angle sensor 411, a dipper stick angle sensor 412, and a boom angle sensor 413.

Bucket angle sensor 411 detects a relative angle of bucket 7 from a predetermined reference position. Dipper stick angle sensor 412 detects a relative angle of dipper stick 6 from a predetermined reference position. Boom angle sensor 413 detects a relative angle of boom 5 from a predetermined reference position.

Bucket position detector 41 detects a position of bucket 7 with respect to the body of the work vehicle based on information of the three relative angles as detected. Particularly, the position of bucket 7 in the vehicular body coordinate system is detected. Bucket position detector 41 detects the position of teeth 7A of bucket 7 as the position of bucket 7, for example.

Based on the detected position of bucket 7, display controller 43 causes the work assistance information to be displayed on display device 44. Particularly, display controller 43 controls a content to be displayed by display device 44, and causes the work assistance information to be displayed around bucket 7 while causing the work assistance information to follow the movement of bucket 7. More particularly, when the work assistance information becomes close to a boundary 441 (see FIG. 3) of display area 440 of display device 44 due to the movement of bucket 7, display controller 43 causes the work assistance information to be displayed on display device 44 with a relative position between the work assistance information and bucket 7 being changed. It should be noted that an inner side relative to boundary 441 is display area 440.

Typically, based on the display position (coordinates) of the work assistance information in display area 440, display controller 43 determines whether or not the work assistance information becomes close to boundary 441 of display area 440. Moreover, the display position of the work assistance information is determined by the position of bucket 7.

The determination as to whether or not the work assistance information becomes close to boundary 441 is not limited to the manner described above. For example, based on the detected position of bucket 7, display controller 43 may determine whether or not the work assistance information becomes close to boundary 441. In this case, display controller 43 can determine whether or not the work assistance information becomes close to boundary 441, by determining whether or not bucket 7 becomes close to a boundary of a three-dimensional predetermined area (hereinafter, referred to as "three-dimensional area Q").

It should be noted that three-dimensional area Q is typically defined by respective coordinate values of a three-dimensional coordinate system (particularly, the vehicular body coordinate system) in work vehicle 101. These coordinate values are set in advance by a work vehicle manufacturer or the like. More particularly, three-dimensional area Q is defined in accordance with the installation position of display device 44 in the vehicular body coordinate system. Much more particularly, three-dimensional area Q is defined in accordance with the position of the display area of work vehicle 101.

Specifically, three-dimensional area Q is an area in which work assistance information 92 can follow bucket 7. Particularly, when attention is paid to one piece of work assistance information, three-dimensional area Q is defined as a position of bucket 7 at which the work assistance information can be displayed on display device 44 without changing the position of the work assistance information relative to bucket 7.

As described above, the display position of the work assistance information is determined by the position of bucket 7. Hence, the expression "bucket 7 becomes close to the boundary of three-dimensional area Q" means that the work assistance information becomes close to boundary 441 in display area 440.

Moreover, display controller 43 may determine whether or not the work assistance information becomes close to boundary 441 of display area 440, based on a position (coordinate values in a display area) of an intersection between display area 440 and an imaginary line that connects the detected position of bucket 7 to the position of the viewpoint (reference position described above) of the operator.

Display controller 43 will be described more in detail as follows. Display controller 43 has an image generator 431 and a display position processor 432.

Image generator 431 generates an image to be displayed on display device 44. Image generator 431 generates an image representing a vehicular speedometer, an engine revolution indicator, a fuel indicator, a hydraulic temperature indicator, and the like. Further, image generator 431 generates images representing a plurality of pieces of work assistance information. A specific example of the work assistance information will be described with reference to FIG. 3 and the like.

Particularly, image generator 431 is connected to a controller (not shown) that controls a motive power system of work vehicle 101. Image generator 431 receives information detected by various sensors, information regarding a content of control performed by the controller, and the like. Based on the received information, image generator 431 generates an image to be displayed on display device 44.

Display position processor 432 calculates a display position of the image on display device 44, and causes the image to be displayed at the calculated display position. Particularly, the display position processor calculates the display position of the work assistance information on display device 44, and causes the work assistance information to be displayed at the calculated position.

Specifically, display position processor 432 calculates the display position of the work assistance information on display device 44 based on the position of bucket 7 detected by bucket position detector 41 and the above-described reference position. Specifically, display position processor 432 calculates the display position at which the work assistance information is to be visually recognized around bucket 7 when viewed from cab 8. Details of the display position calculated by display position processor 432 will be described later (FIG. 3 to FIG. 8 and the like).

More particularly, display controller 43 calculates the position of bucket 7 and the position of teeth 7A of bucket 7 on display device 44. With such a calculation process, the display position of the work assistance information can be caused to follow the movement of bucket 7. It should be noted that display controller 43 is implemented by a processor such as a CPU, a storage such as RAM and ROM, and the like.

C. User Interface

Next, with reference to FIG. 3 to FIG. 8, the following describes a method for displaying the work assistance information on display device 44.

c1. Manner of Displaying Work Assistance Information

Figure 3:
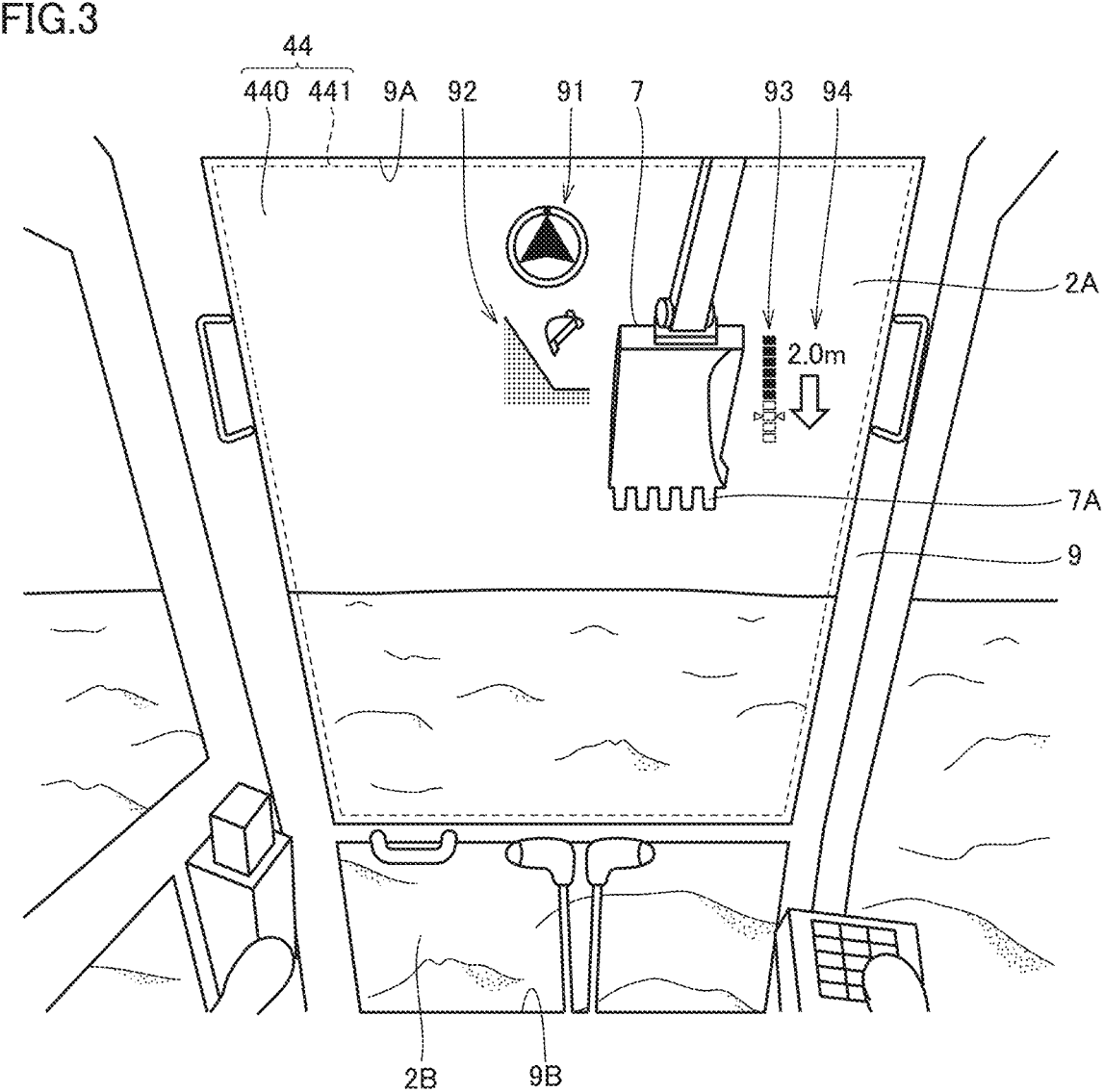
FIG. 3 shows a content displayed on a display device in an aspect.

FIG. 3 shows a content displayed on display device 44 in a certain aspect. As shown in FIG. 3, display controller 43 causes a plurality of pieces of work assistance information 91 to 94 to be displayed at display area 440 of display device 44. Particularly, display controller 43 causes the plurality of pieces of work assistance information 91 to 94 at respective positions at which the plurality of pieces of work assistance information 91 to 94 are visually recognized around bucket 7. Preferably, display controller 43 causes the plurality of pieces of work assistance information 91 to 94 to be displayed at positions higher than teeth 7A of bucket 7.

In the example of FIG. 3, display controller 43 controls the display positions of pieces of work assistance information 91, 92 on display device 44 such that the pieces of work assistance information 91, 92 are visually recognized at left positions relative to bucket 7 when viewed from cab 8. Further, display controller 43 controls the display positions of pieces of work assistance information 93, 94 on display device 44 such that the pieces of work assistance information 93, 94 are visually recognized at right positions relative to bucket 7 when viewed from cab 8.

Work assistance information 91 represents a facing angle compass. The facing angle compass indicates whether or not work vehicle 101 directly faces design topography data. Furthermore, when work vehicle 101 does not directly face the design topography data, the facing angle compass indicates an amount of displacement by way of a rotation angle indicated by an arrow inside a circle. When work vehicle 101 does not directly face the design topography data, display controller 43 may cause work assistance information 91 to be displayed on display device 44 in a manner different from the manner shown in FIG. 3 by deleting the arrow inside the circle of work assistance information 91. Moreover, when the work vehicle cannot directly face the design topography data even if the work vehicle is oriented in all the directions, display controller 43 may cause work assistance information 91 to be displayed on display device 44 in a manner different from the manner shown in FIG. 3.

Work assistance information 92 represents the design topography and the teeth in a cross section (lateral cross section).

Work assistance information 93 represents a bar indicator. The bar indicator is displayed when finishing excavation is performed. The bar indicator indicates a distance between the design topography and teeth 7A more in detail than below-described work assistance information 94. Work assistance information 94 indicates a direction of the design topography and a distance between the design topography and teeth 7A. Work assistance information 94 is displayed at the time of rough excavation and at the time of finishing excavation.

It should be noted that the pieces of work assistance information 91 to 94 shown in FIG. 3 are exemplary and the work assistance information displayed on display device 44 is not limited thereto.

Figure 4:
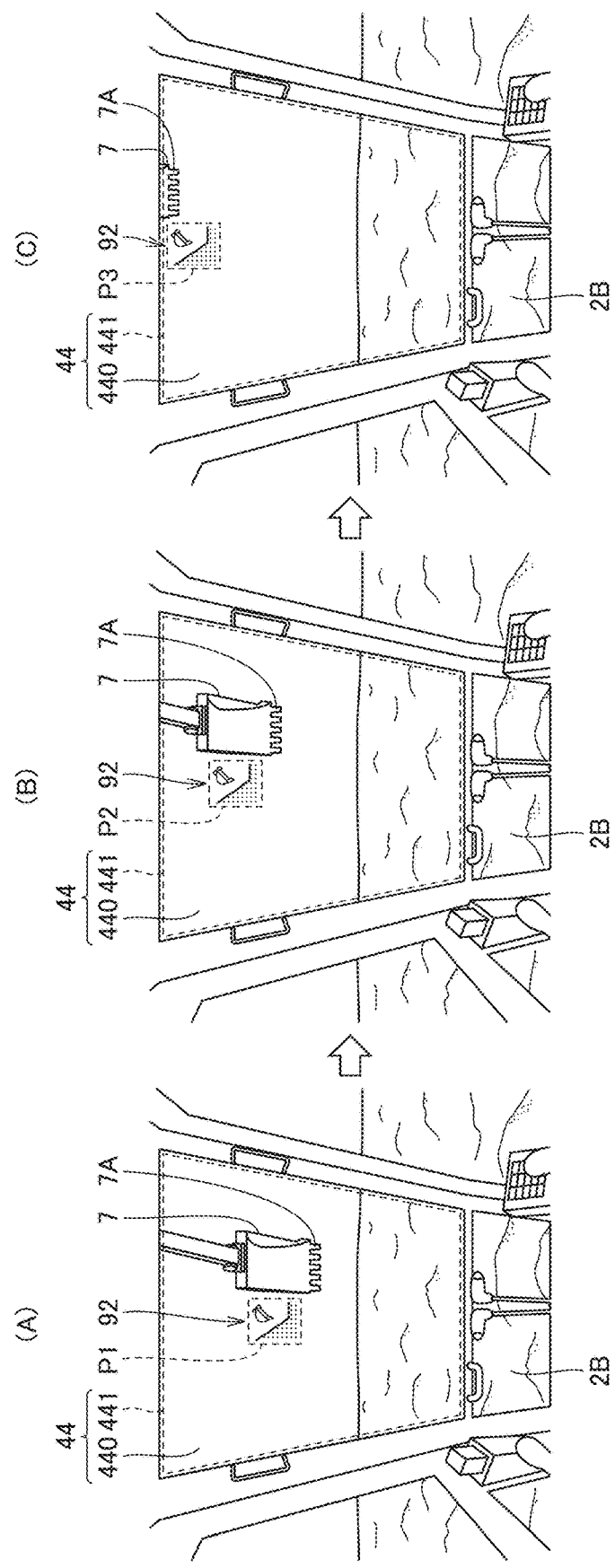
FIG. 4 illustrates a display position of work assistance information when a bucket is moved upward.

Moreover, although details will be described later, each of the pieces of work assistance information 91 to 94 follows the movement of bucket 7 in the upward direction and the downward direction (FIG. 4 to FIG. 7). Moreover, each of the pieces of work assistance information 91 to 94 follows the movement of cab 8 of bucket 7 in the frontward direction and the rearward direction (FIG. 8).

c2. Following Process in Upward Direction and Boundary Process at Upper End Portion (1) First Example FIG. 4 illustrates a display position of work assistance information 92 when bucket 7 is moved upward. As shown in FIG. 4, bucket 7 in a state (B) is at a position higher than that of bucket 7 in a state (A). Moreover, bucket 7 in a state (C) is at a position higher than that of bucket 7 in the state (B). It should be noted that each of the state (A) and the state (B) represents a case where bucket 7 is in three-dimensional area Q. On the other hand, the state (C) represents a case where bucket 7 is outside three-dimensional area Q.

When bucket 7 is at the position shown in the state (A), display system 40 displays work assistance information 92 at a left position P1 relative to bucket 7 when viewed from the operator in cab 8. Particularly, display controller 43 of display system 40 causes work assistance information 92 to be displayed at a position higher than teeth 7A of bucket 7.

When bucket 7 is moved upward from the state (A), display controller 43 performs a process for causing the display position of work assistance information 92 on display device 44 to follow the movement of bucket 7 based on a position of bucket 7 sequentially detected by bucket position detector 41. More particularly, display controller 43 causes the display position of work assistance information 92 to follow the movement of bucket 7 to attain a constant relative positional relation between bucket 7 and work assistance information 92.

When bucket 7 reaches a position shown in the state (B), display controller 43 causes work assistance information 92 to be displayed at position P2. Position P2 is a position that is higher than position P1 shown in the state (A) and that is located at the left side relative to bucket 7. It should be noted that also in this case, since the positional relation between bucket 7 and the work assistance information is maintained to be constant, work assistance information 92 is displayed at a position higher than teeth 7A of bucket 7.

When bucket 7 is moved further upward from inside three-dimensional area Q to outside three-dimensional area Q after the state (B), work assistance information 92 cannot follow bucket 7 because the width of the display area of display device 44 in the upward and downward directions is narrower than the movable range of bucket 7 in the upward and downward directions.

Hence, display controller 43 stops the process for causing the display position of work assistance information 92 to follow the movement of bucket 7. Specifically, as shown in the state (C), display controller 43 causes work assistance information 92 to be displayed at position P3 higher than position P2. Position P3 is an upper end area of display device 44. To be precise, position P3 is a display position of the work assistance information just before bucket 7 is moved out of three-dimensional area Q.

It should be noted that although display controller 43 causes work assistance information 92 to be displayed at position P3 in the state (C), the configuration is not limited thereto. When bucket 7 is moved from inside three-dimensional area Q to outside three-dimensional area Q, display controller 43 may cause work assistance information 92 to be displayed at a left corner or right corner of the display area of display device 44 or the like. For example, display controller 43 may cause work assistance information 92 to be displayed at the left corner (area at the upper left corner) of the upper area.

The above-described process can be summarized as described in (i) to (iii) below.

(i) When bucket 7 is in three-dimensional area Q, display controller 43 causes the display position of work assistance information 92 on display device 44 to follow the movement of bucket 7 based on the detected position of bucket 7. When bucket 7 is outside three-dimensional area Q, display controller 43 does not cause the display position of work assistance information 92 on display device 44 to follow the movement of bucket 7.

According to the above-described configuration, even when bucket 7 is moved from inside three-dimensional area Q to outside three-dimensional area Q (particularly, even when the display position of work assistance information 92 cannot be caused to follow bucket 7), work assistance information 92 can continue to be securely displayed by stopping causing work assistance information 92 to follow bucket 7. Therefore, according to work vehicle 101, the displaying of the work assistance information can be appropriately controlled as described above. Hence, the operability of work vehicle 101 can be improved.

(ii) Moreover, when bucket 7 is in three-dimensional area Q, display controller 43 controls the display position of work assistance information 92 on display device 44 such that work assistance information 92 is visually recognized around bucket 7 when viewed from cab 8. According to the above-described configuration, the operability of work vehicle 101 can be improved as compared with a configuration in which work assistance information 92 is not visually recognized around bucket 7 when viewed from cab 8.

(iii) Moreover, when bucket 7 is moved upward from inside three-dimensional area Q to outside three-dimensional area Q, display controller 43 causes work assistance information 92 to be displayed at the upper end area of display area 440. According to the above-described configuration, the work assistance information is displayed at the same or close position as or to the position at which the work assistance information has been displayed just before the work assistance information cannot follow bucket 7. Hence, as compared with the case of displaying work assistance information 92 at a different area, displaying can be performed with excellent convenience for the operator.

(2) Second Example

Figure 5:
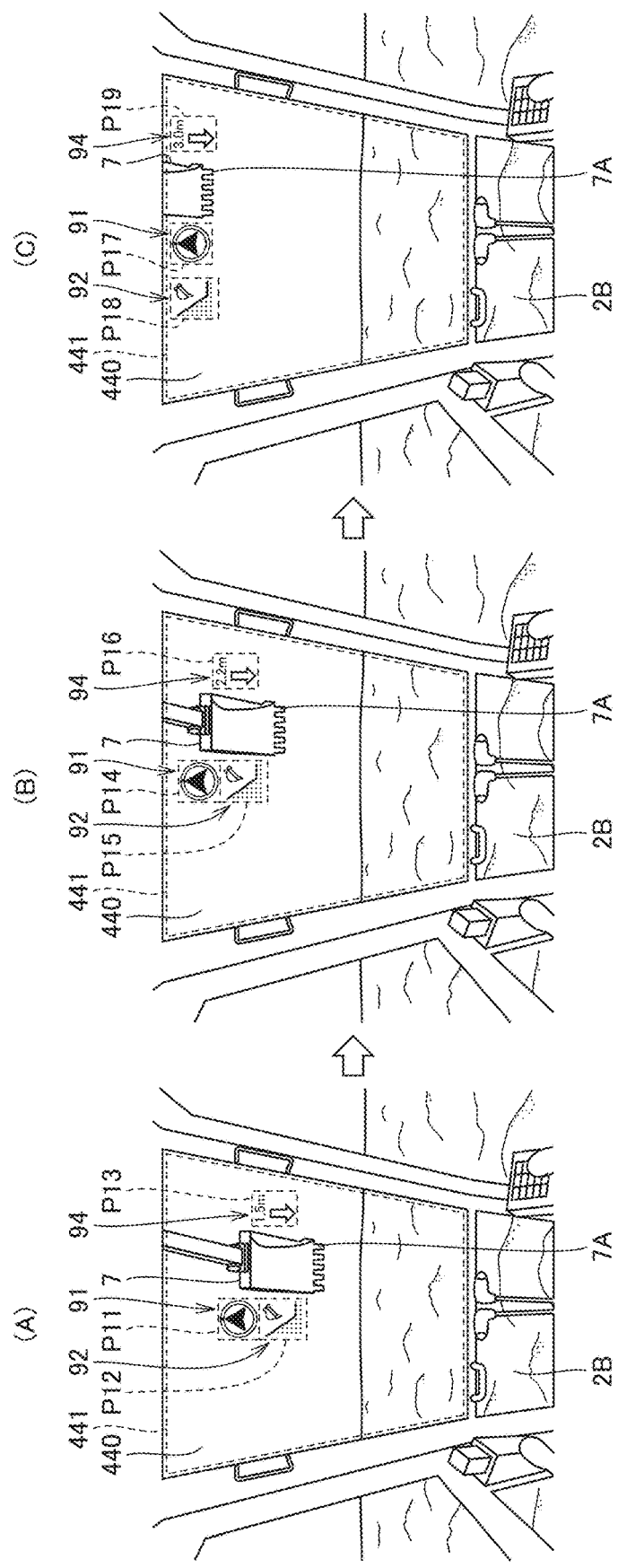
FIG. 5 illustrates each display position of a plurality of pieces of work assistance information when the bucket is moved upward.

FIG. 5 illustrates each display position of a plurality of pieces of work assistance information 91, 92, 94 when bucket 7 is moved upward. As shown in FIG. 5, bucket 7 in a state (B) is at a position higher than that of bucket 7 in a state (A). Moreover, bucket 7 in a state (C) is at a position higher than that of bucket 7 in the state (B). It should be noted that each of the state (A) and the state (B) represents a case where bucket 7 is in three-dimensional area Q. On the other hand, the state (C) represents a case where bucket 7 is outside three-dimensional area Q.

When bucket 7 is at the position shown in the state (A), display system 40 respectively displays the three pieces of work assistance information 91, 92, 94 at positions P11, P12, P13. It should be noted that positions P11, P12 are left positions relative to bucket 7 when viewed from the operator. Position P13 is a right position relative to bucket 7 when viewed from the operator. More particularly, display controller 43 causes the pieces of work assistance information 91, 92, 94 to be displayed at positions higher than teeth 7A of bucket 7. Moreover, position P11 at which work assistance information 91 is displayed is higher than position P12 at which work assistance information 92 is displayed and position P13 at which work assistance information 94 is displayed.

When bucket 7 is moved upward from the state (A), display controller 43 performs a process for causing the display positions of the pieces of work assistance information 91, 92, 94 on display device 44 to follow the movement of bucket 7 based on a position of bucket 7 sequentially detected by bucket position detector 41. More particularly, display controller 43 causes the display positions of the pieces of work assistance information 91, 92, 94 to follow the movement of bucket 7 to attain a constant relative positional relation between bucket 7 and each of the pieces of work assistance information 91, 92, 94.

When bucket 7 reaches a position shown in the state (B), display controller 43 respectively causes the three pieces of work assistance information 91, 92, 94 to be displayed at positions P14, P15, P16. Positions P14, P15, P16 are positions higher than positions P11, P12, P13 shown in the state (A), respectively. Positions P14, P15 are left positions relative to bucket 7 when viewed from the operator. Position P16 is a right position relative to bucket 7 when viewed from the operator. It should be noted that also in this case, since the positional relation between bucket 7 and the work assistance information is maintained to be constant, the pieces of work assistance information 91, 92, 94 are displayed at positions higher than teeth 7A of bucket 7. Moreover, position P14 at which work assistance information 91 is displayed is higher than position P15 at which work assistance information 92 is displayed and position P16 at which work assistance information 94 is displayed.

When bucket 7 is moved further upward from inside three-dimensional area Q to outside three-dimensional area Q after the state (B), work assistance information 91 first cannot follow bucket 7. Particularly, at least work assistance information 91 of the three pieces of work assistance information 91, 92, 94 cannot follow bucket 7. More particularly, due to existence of work assistance information 91, work assistance information 92 positioned below work assistance information 91 also cannot follow bucket 7.

Hence, display controller 43 stops the process for causing the display position of work assistance information 91 to follow the movement of bucket 7. Particularly, display controller 43 changes a relative position between bucket 7 in display area 440 and each of the plurality of pieces of work assistance information 91, 92, 94. Specifically, display controller 43 changes an arrangement of the plurality of pieces of work assistance information 91, 92, 94. Typically, display controller 43 changes the arrangement of the three pieces of work assistance information 91, 92, 94 such that the display positions of the three pieces of work assistance information 91, 92, 94 are at the same level in the upward and downward directions (height direction). For example, when the display position of work assistance information 94 is higher than the display position of work assistance information 92, display controller 43 arranges work assistance information 91 and work assistance information 92 adjacent to each other in the lateral direction, whereby the heights of the display positions of the pieces of work assistance information 91 and 92 become the same as the height of the display position of work assistance information 94.

Specifically, as shown in the state (C), display controller 43 respectively causes the three pieces of work assistance information 91, 92, 94 to be displayed at positions P17, P18, P19 at the same height. It should be noted that positions P17, P18, P19 are the upper end area of display area 440.

It should be noted that although display controller 43 causes work assistance information 91 to be displayed at the right side relative to work assistance information 92 when viewed from the operator in the state (C), the configuration is not limited thereto. When work assistance information 91 cannot follow bucket 7, display controller 43 may cause work assistance information 91 to be displayed at the left side relative to work assistance information 92 when viewed from the operator.

The above-described process can be summarized as described in (i) to (iii) below.

(i) When the work assistance information becomes close to boundary 441 of display area 440 of display device 44 due to the movement of bucket 7, display controller 43 causes the work assistance information to be displayed on display device 44 with the relative position between the work assistance information and bucket 7 in display area 440 being changed.

According to the above-described configuration, when the work assistance information becomes close to boundary 441 of display area 440 of display device 44, the work assistance information is displayed with the relative position between the work assistance information and bucket 7 being changed, whereby the work assistance information can continue to be securely displayed. Hence, the operability of work vehicle 101 can be improved. Further, the operability of work vehicle 101 can be improved as compared with a configuration in which the work assistance information is not displayed around bucket 7.

(ii) When the work assistance information becomes close to boundary 441 due to the movement of bucket 7 in the upward direction, display controller 43 is configured to change the relative position between the work assistance information and bucket 7 at the upper end area of display area 440.

According to the above-described configuration, the work assistance information is displayed at the same or close position as or to the position at which the work assistance information has been displayed just before the work assistance information cannot follow the movement of bucket 7. Hence, as compared with a case of displaying the work assistance information at a different position, displaying can be performed with excellent convenience for the operator.

Figure 6:
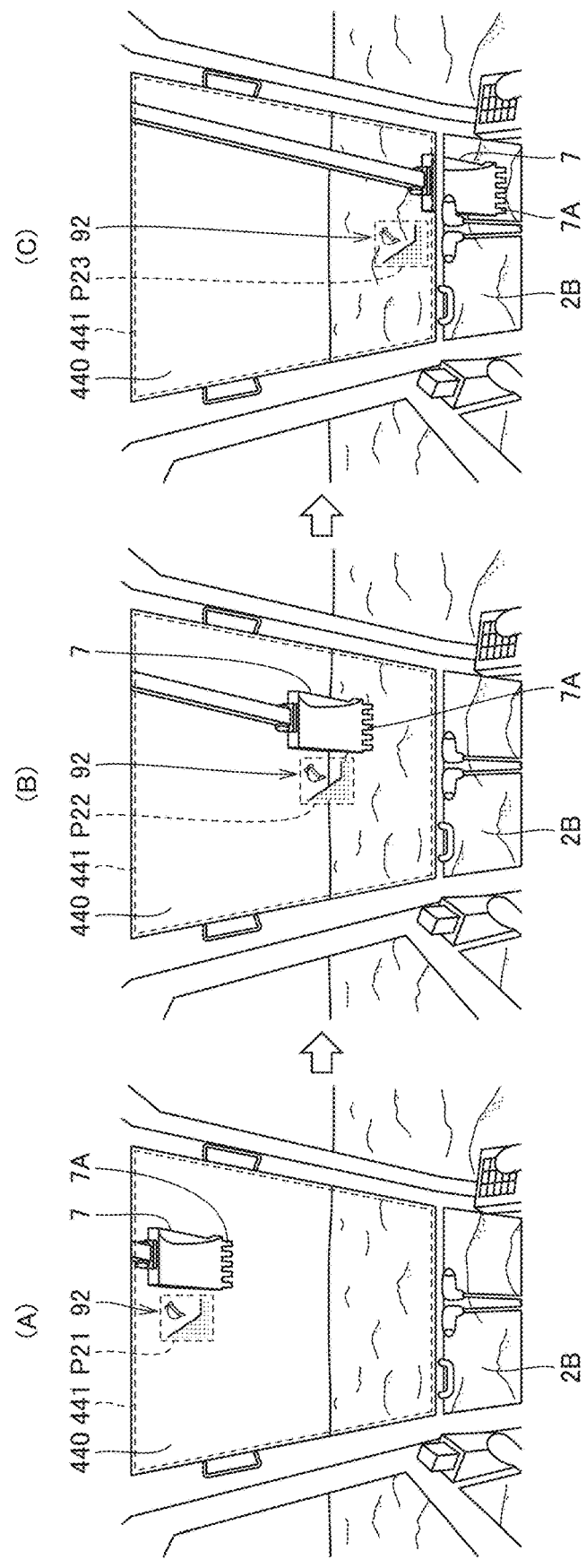
FIG. 6 illustrates a display position of work assistance information when the bucket is moved downward.

(iii) Display controller 43 is configured to cause the plurality of pieces of work assistance information 91, 92, 94 to be displayed on display device 44 in a predetermined arrangement. When at least one of the plurality of pieces of work assistance information 91, 92, 94 becomes close to boundary 441 due to the movement of bucket 7, display controller 43 changes the arrangement of the pieces of work assistance information. According to the above-described configuration, even when there is work assistance information that cannot follow bucket 7 (for example, work assistance information 91 in the figure), the work assistance information can continue to be displayed.

c3. Following Process in Downward Direction and Boundary Process at Lower End Portion (1) First Example FIG. 6 illustrates the display position of work assistance information 92 when bucket 7 is moved downward. As shown in FIG. 6, bucket 7 in a state (B) is at a position lower than that of bucket 7 in a state (A). Moreover, bucket 7 in a state (C) is at a position lower than that of bucket 7 in the state (B). It should be noted that each of the state (A) and the state (B) represents a case where bucket 7 is in three-dimensional area Q. On the other hand, the state (C) represents a case where bucket 7 is outside three-dimensional area Q.

When bucket 7 is at the position shown in the state (A), display system 40 displays work assistance information 92 at a left position 21 relative to bucket 7. Particularly, display controller 43 of display system 40 causes work assistance information 92 to be displayed at the position higher than teeth 7A of bucket 7.

When bucket 7 is moved downward from the state (A), display controller 43 performs a process for causing the display position of work assistance information 92 on display device 44 to follow the movement of bucket 7 based on a position of bucket 7 sequentially detected by bucket position detector 41. More particularly, display controller 43 causes the display position of work assistance information 92 to follow the movement of bucket 7 to attain a constant relative positional relation between bucket 7 and work assistance information 92.

When bucket 7 reaches a position shown in the state (B), display controller 43 causes work assistance information 92 to be displayed at a position P22. Position P22 is a position that is lower than position P21 shown in the state (A) and that is located at the left side relative to bucket 7. It should be noted that also in this case, since the positional relation between bucket 7 and the work assistance information is maintained to be constant, work assistance information 92 is displayed at a position higher than teeth 7A of bucket 7.

When bucket 7 is moved further downward from inside three-dimensional area Q to outside three-dimensional area Q after the state (B), work assistance information 92 cannot follow bucket 7 because the width of the display area of display device 44 in the upward and downward directions is narrower than the movable range of bucket 7 in the upward and downward directions.

Hence, display controller 43 stops the process for causing the display position of work assistance information 92 to follow the movement of bucket 7. Specifically, as shown in the state (C), display controller 43 displays work assistance information 92 at a position P23 lower than position P22. Position P23 is a lower end area of display device 44. To be precise, position P23 is a display position of the work assistance information just before bucket 7 is moved out of three-dimensional area Q.

It should be noted that although display controller 43 causes work assistance information 92 to be displayed at position P23 in the state (C), the configuration is not limited thereto. When bucket 7 is moved from inside three-dimensional area Q to outside three-dimensional area Q, display controller 43 may cause work assistance information 92 to be displayed at a left corner or right corner of the display area of display device 44 or the like. For example, display controller 43 may cause work assistance information 92 to be displayed at the left corner (area at the upper lower left corner) of the lower area.

As described above, when bucket 7 is moved downward from inside three-dimensional area Q to outside three-dimensional area Q, display controller 43 causes work assistance information 92 to be displayed at the lower end area (position P23 in the case of FIG. 6) of display area 440. According to the above-described configuration, the work assistance information is displayed at the same or close position as or to the position at which the work assistance information has been displayed just before the work assistance information cannot follow bucket 7. Hence, as compared with a case of displaying the work assistance information at a different area, displaying can be performed with excellent convenience for the operator.

(2) Second Example

Figure 7:
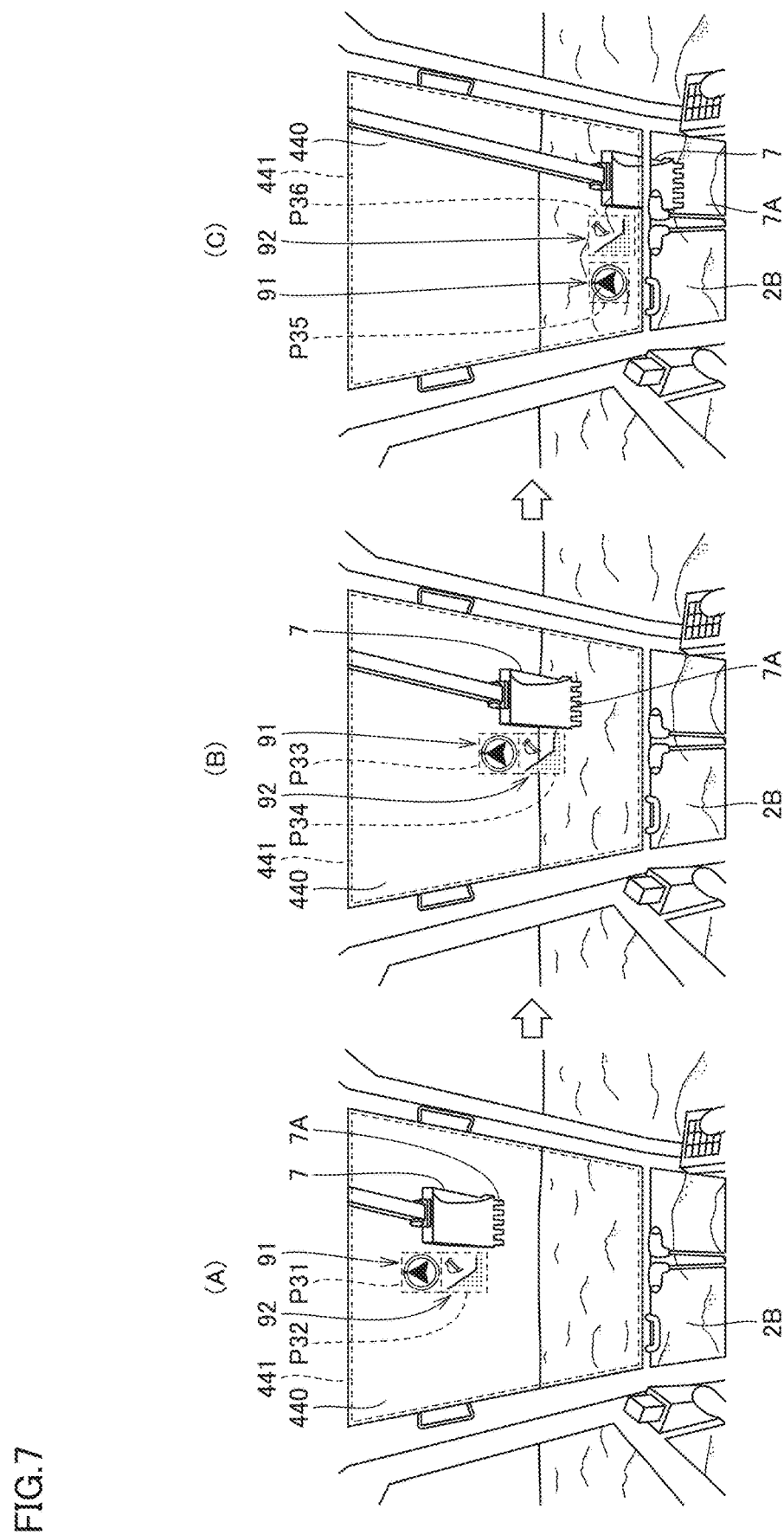
FIG. 7 illustrates each display position of a plurality of pieces of work assistance information when the bucket is moved downward.
Figure 8:
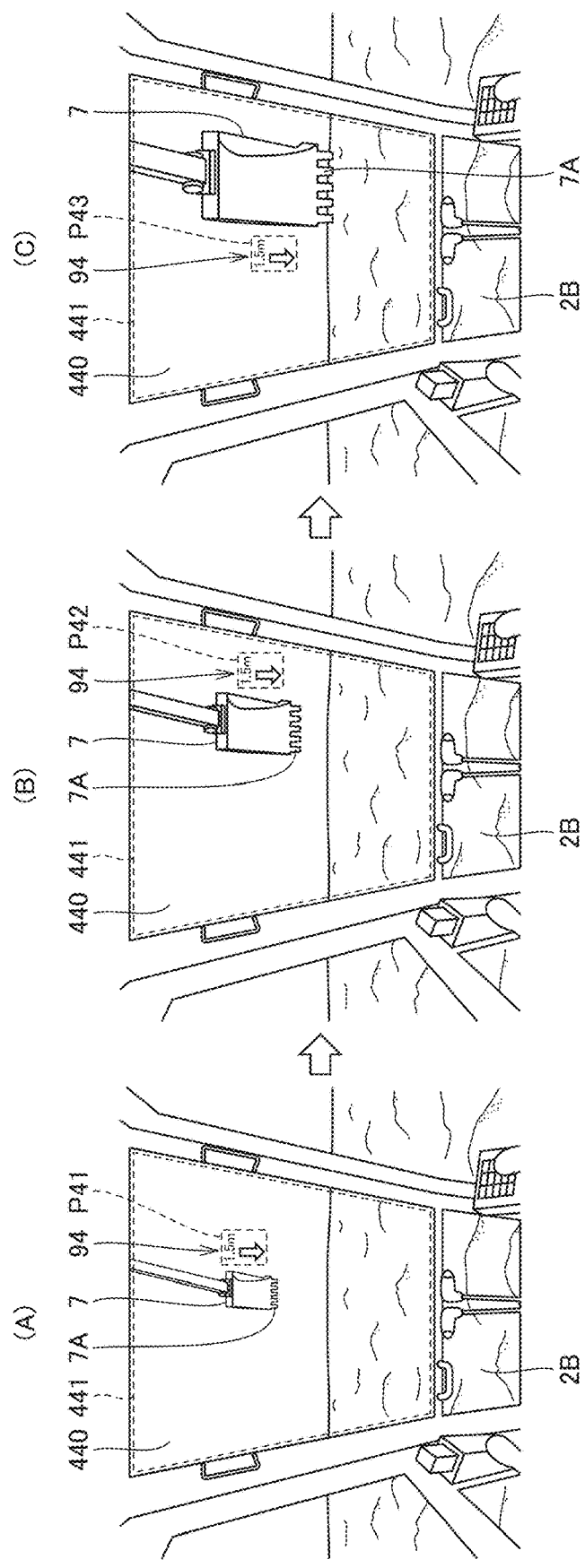
FIG. 8 illustrates a display position of work assistance information when the bucket is moved in a direction (rearward direction) in which the bucket becomes close to a cab.

FIG. 7 illustrates each display position of a plurality of pieces of work assistance information 91, 92 when bucket 7 is moved downward. As shown in FIG. 7, bucket 7 in a state (B) is at a position lower than that of bucket 7 in a state (A). Moreover, bucket 7 in a state (C) is at a position lower than that of bucket 7 in the state (B). It should be noted that each of the state (A) and the state (B) represents a case where bucket 7 is in three-dimensional area Q. On the other hand, the state (C) represents a case where bucket 7 is outside three-dimensional area Q.

When bucket 7 is at the position shown in the state (A), display system 40 respectively displays the two pieces of work assistance information 91, 92 at positions P31, P32. It should be noted that positions P31, P32 are left positions relative to bucket 7 when viewed from the operator. Particularly, display controller 43 of display system 40 causes the pieces of work assistance information 91, 92 to be displayed at positions higher than teeth 7A of bucket 7. Moreover, position P31 at which work assistance information 91 is displayed is higher than position P32 at which work assistance information 92 is displayed.

When bucket 7 is moved downward from the state (A), display controller 43 performs a process for causing the display positions of the pieces of work assistance information 91, 92 on display device 44 to follow the movement of bucket 7 based on a position of bucket 7 sequentially detected by bucket position detector 41. More particularly, display controller 43 causes the display positions of the pieces of work assistance information 91, 92 to follow the movement of bucket 7 to attain a constant relative positional relation between bucket 7 and each of the pieces of work assistance information 91, 92.

When bucket 7 reaches a position shown in the state (B), display controller 43 respectively causes the two pieces of work assistance information 91, 92 to be displayed at positions P33, P34. Positions P33, P34 are positions lower than positions P31, P32 shown in the state (A), respectively. Positions P33, P34 are left positions relative to bucket 7 when viewed from the operator. It should be noted that also in this case, since the positional relation between bucket 7 and the work assistance information is maintained to be constant, the pieces of work assistance information 91, 92 are displayed at positions higher than teeth 7A of bucket 7. Moreover, position P33 at which work assistance information 91 is displayed is higher than position P34 at which work assistance information 92 is displayed.

When bucket 7 is moved further downward from inside three-dimensional area Q to outside three-dimensional area Q after the state (B), work assistance information 92 first cannot follow bucket 7. Particularly, at least work assistance information 92 of the two pieces of work assistance information 91, 92 cannot follow bucket 7. More particularly, due to existence of work assistance information 92, work assistance information 91 positioned above work assistance information 92 also cannot follow bucket 7.

Hence, display controller 43 stops the process for causing the display position of work assistance information 92 to follow the movement of bucket 7. Particularly, display controller 43 changes a relative position between bucket 7 in display area 440 and each of the plurality of pieces of work assistance information 91, 92. Specifically, display controller 43 changes an arrangement of the plurality of pieces of work assistance information 91, 92. Typically, display controller 43 changes the arrangement of the two pieces of work assistance information 91, 92 such that the display positions of the two pieces of work assistance information 91, 92 are at the same level in the upward and downward directions (height direction). For example, display controller 43 arranges work assistance information 91 and work assistance information 92 adjacent to each other in the lateral direction, whereby the heights of the display positions of the pieces of work assistance information 91 and 92 become the same.

Specifically, as shown in the state (C), display controller 43 respectively causes the two pieces of work assistance information 91, 92 to be displayed at positions P35, P36 at the same height. It should be noted that positions P35, P36 are the lower end area of display area 440.

It should be noted that although display controller 43 causes work assistance information 91 to be displayed at the left side relative to work assistance information 92 when viewed from the operator in the state (C), the configuration is not limited thereto. When work assistance information 91 cannot follow bucket 7, display controller 43 may cause work assistance information 91 to be displayed at the right side relative to work assistance information 92 when viewed from the operator.

As described above, when the work assistance information becomes close to boundary 441 of display area 440 of display device 44 due to the movement of bucket 7, display controller 43 causes the work assistance information to be displayed on display device 44 with the relative position between the work assistance information and bucket 7 being changed. Particularly, when the work assistance information becomes close to boundary 441 due to the movement of bucket 7 in the downward direction, display controller 43 is configured to change the relative position between the work assistance information and bucket 7 at the lower end area of display area 440.

More particularly, display controller 43 is configured to cause the plurality of pieces of work assistance information 91, 92 to be displayed on display device 44 in a predetermined arrangement. When at least one of the plurality of pieces of work assistance information 91, 92 becomes close to boundary 441 due to the movement of bucket 7, display controller 43 changes the arrangement of the pieces of work assistance information. According to the above-described configuration, even when there is work assistance information that cannot follow bucket 7, the work assistance information can continue to be displayed.

c4. Following Process in Rearward Direction and Boundary Process

FIG. 8 illustrates a display position of work assistance information 94 when bucket 7 is moved in the direction (rearward direction) in which bucket 7 becomes close to cab 8. As shown in FIG. 8, bucket 7 in a state (B) is at a position closer to cab 8 than bucket 7 in a state (A). Moreover, bucket 7 in a state (C) is at a position closer to cab 8 than bucket 7 in the state (B). It should be noted that each of the state (A) and the state (B) represents a case where bucket 7 is in three-dimensional area Q. On the other hand, the state (C) represents a case where bucket 7 is outside three-dimensional area Q.

When bucket 7 is at the position shown in the state (A), display system 40 displays work assistance information 94 at a right position P41 relative to bucket 7 when viewed from the operator in cab 8. Particularly, display controller 43 of display system 40 causes work assistance information 94 to be displayed at a position higher than teeth 7A of bucket 7.

When bucket 7 is moved rearward (toward the cab 8 side) from the state (A), display controller 43 performs a process for causing the display position of work assistance information 94 on display device 44 to follow the movement of bucket 7 based on a position of bucket 7 sequentially detected by bucket position detector 41. More particularly, display controller 43 causes the display position of work assistance information 94 to follow the movement of bucket 7 to attain a constant relative positional relation between bucket 7 and work assistance information 94.

When bucket 7 reaches a position shown in the state (B), display controller 43 causes work assistance information 94 to be displayed at position P42. Position P42 is a right position relative to bucket 7 when viewed from the operator.

It should be noted that also in this case, since the positional relation between bucket 7 and the work assistance information is maintained to be constant, work assistance information 94 is displayed at a position higher than teeth 7A of bucket 7.

When bucket 7 is moved further rearward from inside three-dimensional area Q to outside three-dimensional area Q after the state (B), the width of the display area of display device 44 at the right side relative to bucket 7 becomes narrow. Particularly, since the visually recognized area of bucket 7 in display device 44 is increased, the area around the bucket at the right side relative to bucket 7 when viewed from the operator becomes narrow. Accordingly, display controller 43 cannot cause work assistance information 94 to be displayed at the right side relative to bucket 7 when viewed from the operator. Particularly, display controller 43 cannot cause work assistance information 94 to follow the movement of bucket 7 in an area at the right side relative to bucket 7 when viewed from the operator.

Therefore, display controller 43 changes the relative position between bucket 7 and work assistance information 94. Particularly, in order to cause the display position of work assistance information 94 to follow the movement of bucket 7, display controller 43 stops displaying work assistance information 94 at the right side relative to bucket 7 when viewed from the operator, and causes work assistance information 94 to be displayed at the left side relative to bucket 7 when viewed from the operator. As such, display controller 43 causes work assistance information 94 to be displayed at an opposite position relative to bucket 7. Typically, display controller 43 causes work assistance information 94 to be displayed above teeth 7A of bucket 7.

Then, display controller 43 causes work assistance information 94 to follow the movement of bucket 7 in the rearward direction. For example, when bucket 7 reaches a position shown in the state (C), display controller 43 causes work assistance information 94 to be displayed at position P43.

As described above, when work assistance information 94 becomes close to boundary 441 of display area 440 of display device 44 due to the movement of bucket 7, display controller 43 causes work assistance information 94 to be displayed on display device 44 with the relative position between work assistance information 94 and bucket 7 being changed.

Particularly, when work assistance information 94 becomes close to boundary 441 due to the movement of bucket 7 in the rearward direction (direction toward cab 8), display controller 43 causes work assistance information 94 displayed at the right position relative to bucket 7 to be displayed at the left position relative to bucket 7. According to the above-described configuration, even when bucket 7 becomes close to cab 8, the display position of work assistance information 94 can be caused to follow bucket 7.

It should be noted that in a work vehicle in which the work implement is provided at a position that can be visually recognized at a forward left side relative to the cab, display controller 43 may be configured to cause work assistance information 94 displayed at the left position relative to bucket 7 to be displayed at the right position relative to bucket 7 when work assistance information 94 becomes close to boundary 441 due to the movement of bucket 7 in the rearward direction (direction toward cab 8).

D. Control Structure

Figure 9:
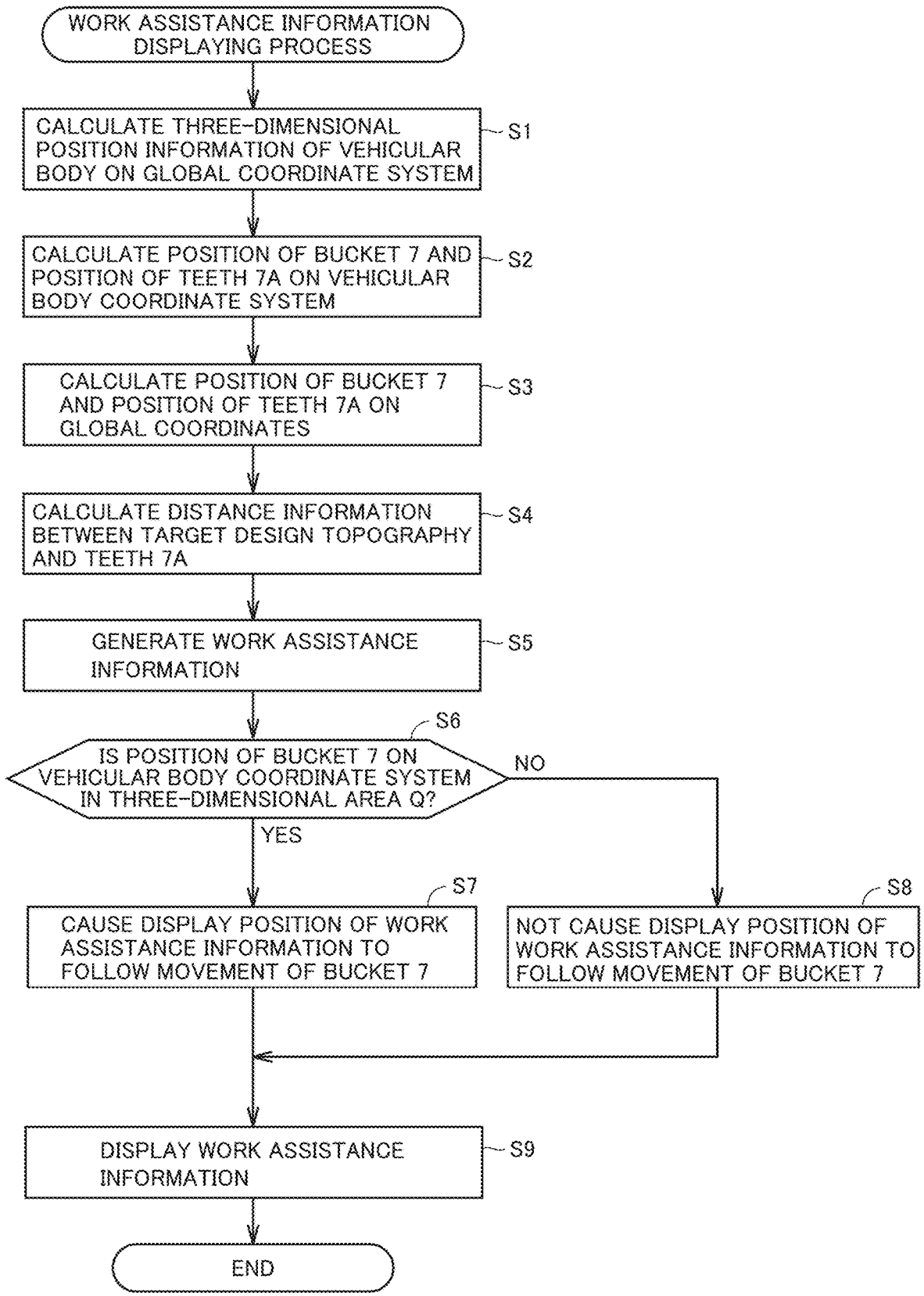
FIG. 9 is a flowchart for illustrating a process of displaying the work assistance information.

FIG. 9 is a flowchart for illustrating a process for displaying the work assistance information. As shown in FIG.

9, in a step S1, display controller 43 calculates three-dimensional position information of work vehicle 101 on a global coordinate system. In a step S2, display controller 43 calculates the position of bucket 7 and the position of teeth 7A on the vehicular body coordinate system. In a step S3, display controller 43 calculates the position of bucket 7 and the position of teeth 7A on the global coordinates. It should be noted that the position of bucket 7 on the global coordinate system and the like are calculated in order to display, on display device 44, information employing target topography information stored in advance.

In a step S4, display controller 43 calculates distance information between the target design topography and teeth 7A based on the current position of teeth of bucket 7 on the global coordinates and the above-described target topography information. In a step S5, display controller 43 generates a display content of the work assistance information based on the distance information calculated in step S4.

In steps S6 to S8, display controller 43 calculates the display position of the work assistance information based on the current position of bucket 7 (for example, the current position of teeth 7A). Particularly, in step S6, based on the position of bucket 7 calculated in step S2, display controller 43 determines whether or not bucket 7 is in three-dimensional area Q. More particularly, based on the bucket position detected by bucket position detector 41, display controller 43 determines whether or not bucket 7 is in three-dimensional area Q.

When it is determined that bucket 7 is in three-dimensional area Q (YES in step S6), in step S7, display controller 43 causes the display position of the work assistance information on display device 44 to follow the movement of bucket 7 based on the position of bucket 7. When it is determined that bucket 7 is outside three-dimensional area Q (NO in step S6), display controller 43 does not cause the display position of the work assistance information on display device 44 to follow the movement of bucket 7 (step S8).

After steps S7 and S8, in a step S9, display controller 43 causes the work assistance information to be displayed at the display position calculated in step S5.

E. Modifications e1. First Modification

In the description above, there has been illustratively described the configuration in which display device 44 is provided in opening frame 9A; however, the configuration is not limited thereto. Another display device may be included also in opening frame 9B. Particularly, cab 8 may be configured to include a transparent dual display. In this case, display controller 43 controls displaying in two display devices.

A work vehicle having such a configuration can also achieve an effect similar to that obtained by work vehicle 101 described above. It should be noted that in this case, the work assistance information can also be displayed in the lower display device. Hence, when bucket 7 is moved in the downward direction, display controller 43 can cause the work assistance information to follow bucket 7 to a position lower than that in the case shown in FIG. 6 and the like.

e2. Second Modification

Figure 10:
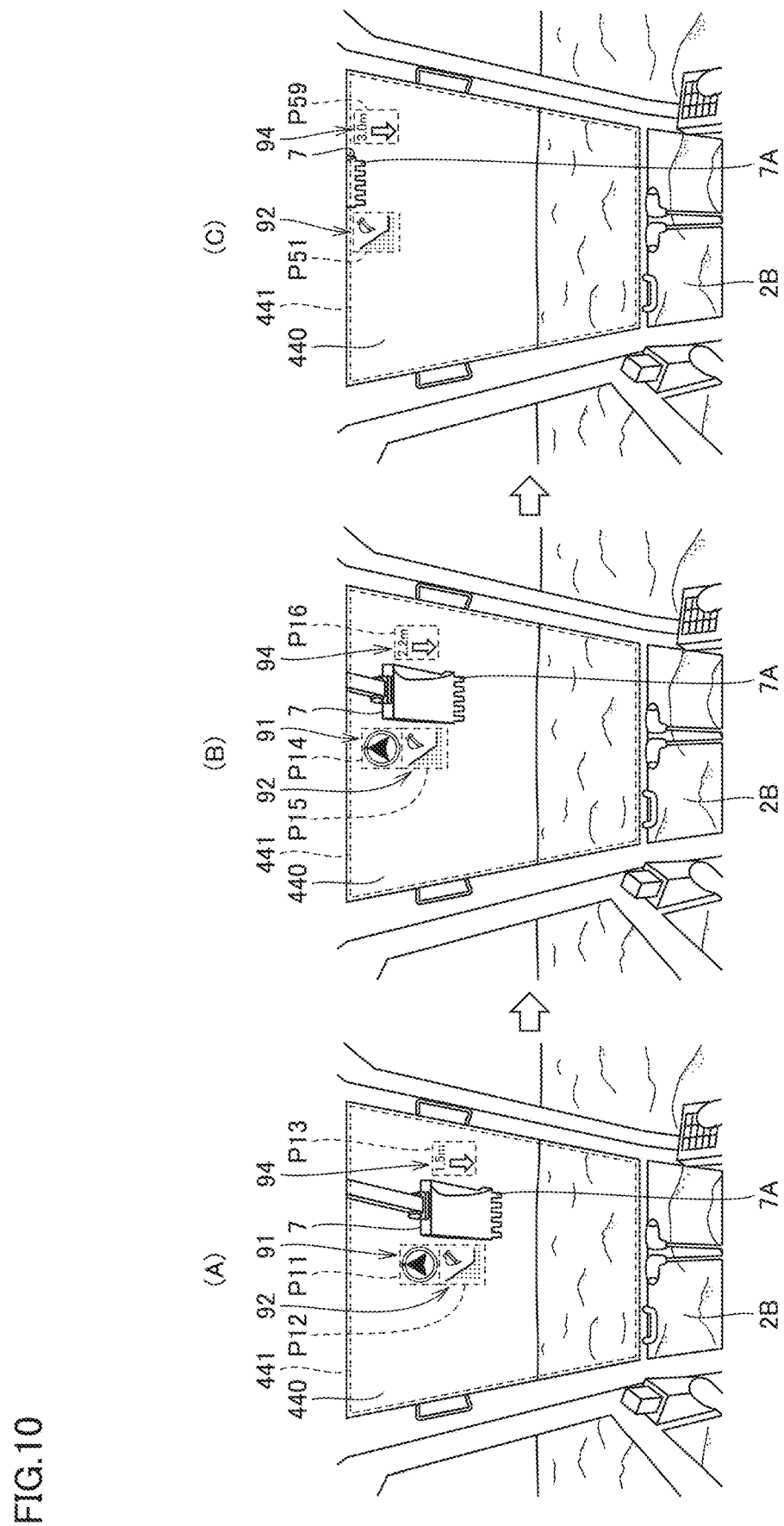
FIG. 10 illustrates each display position of a plurality of pieces of work assistance information when the bucket is moved upward.

FIG. 10 illustrates each display position of a plurality of pieces of work assistance information 91, 92, 94 when bucket 7 is moved upward. As shown in FIG. 10, bucket 7 in a state (B) is at a position higher than that of bucket 7 in a state (A). Moreover, bucket 7 in a state (C) is at a position higher than that of bucket 7 in the state (B). It should be noted that each of the state (A) and the state (B) represents a case where bucket 7 is in three-dimensional area Q. On the other hand, the state (C) represents a case where bucket 7 is outside three-dimensional area Q.

Particularly, the state (A) of FIG. 10 represents the same state as the state (A) of FIG. 5. The state (B) of FIG. 10 represents the same state as the state (B) of FIG. 5. Therefore, the states (A) and (B) of FIG. 10 will not be repeatedly described here.

When bucket 7 is moved further upward from inside three-dimensional area Q to outside three-dimensional area Q after the state (B), work assistance information 91 first cannot follow bucket 7. Particularly, at least work assistance information 91 of the three pieces of work assistance information 91, 92, 94 cannot follow bucket 7. More particularly, due to existence of work assistance information 91, work assistance information 92 positioned below work assistance information 91 also cannot follow bucket 7. Therefore, display controller 43 stops displaying work assistance information 91.

As such, when work assistance information 91 becomes close to boundary 441 of display area 440 of display device 44 due to the movement of bucket 7, display controller 43 stops displaying work assistance information 91.

According to the above-described configuration, by stopping displaying work assistance information 91 when work assistance information 91 becomes close to boundary 441 of display area 440, the operator can visually recognize a front view clearly. Moreover, by stopping displaying work assistance information 91, the other pieces of work assistance information 92, 94 can be caused to follow the bucket. Hence, the operability of the work vehicle can be improved.

e3. Third Modification

Work vehicle 101 may include a display device having a configuration different from that of display device 44. Specifically, work vehicle 101 may include a combiner as a display device.

Figure 11:
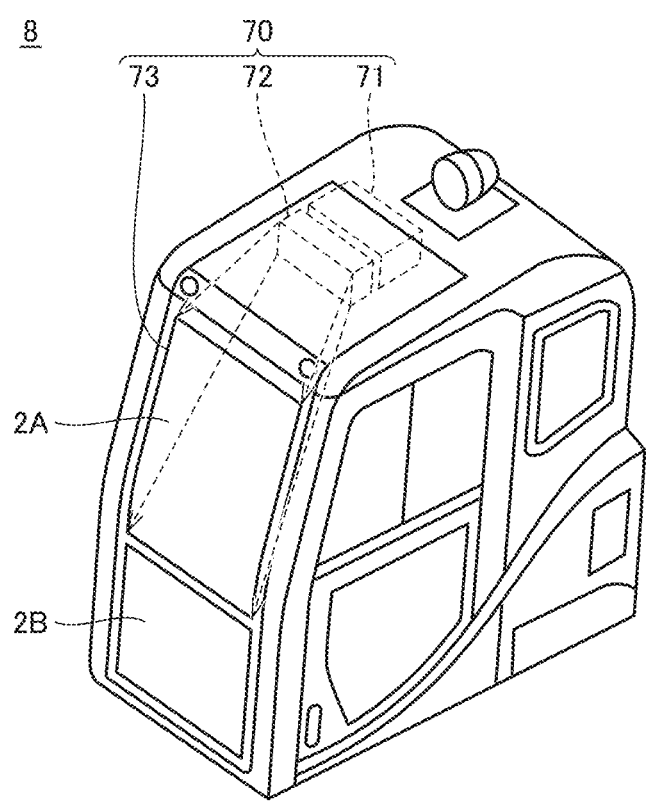
FIG. 11 shows another display device having a configuration different from that of the foregoing display device.

FIG. 11 shows another display device having a configuration different from that of display device 44 according to an embodiment. As shown in FIG. 11, a display device 70 is provided in cab 8, and has a projection device 71, an optical lens system 72, and a combiner 73.

Projection device 71 is a projector. Optical lens system 72 is disposed between projection device 71 and combiner 73. Optical lens system 72 has a plurality of lenses. Optical lens system 72 has the plurality of lenses with some thereof movable along the optical axis.

Combiner 73 is disposed at front windshield 2A. Combiner 73 may be disposed at front windshield 2A and front windshield 2B. Combiner 73 is composed of a half mirror which reflects a part of light and transmits a remainder thereof. Combiner 73 reflects an image projected by projection device 71 to the side of the operator in cab 8 and transmits light from the outside of cab 8 to the interior of cab 8.

Thus, display device 70 allows the operator to recognize the image projected on combiner 73 as a virtual image overlaid and thus displayed on an actual view in front of cab 8.

Thus a work vehicle comprising display device 70 using combiner 73 can also achieve an effect similar to that of work vehicle 101 of an embodiment.

e4. Fourth Modification

In the description above, there has been illustratively described the configuration in which the work assistance information follows the movement of bucket 7 in the whole of display area 440 of display device 44. Particularly, there has been illustratively described the configuration in which the work assistance information follows the movement of bucket 7 to an end area of display area 440 of display device 44 (typically, to the upper end area and lower end area). However, the configuration is not limited thereto.

Display system 40 may be configured to cause the work assistance information to follow the movement of bucket 7 in a part of display area 440 (display screen) of display device 44. For example, the part of display area 440 can be an area that includes a central portion of display area 440 of display device 44 and that does not include at least one of the four end portions (the upper end portion, lower end portion, left end portion, and right end portion) of display area 440 of display device 44. It should be noted that display system 40 may be configured to permit the operator to set the part of display area 440.

Moreover, in this case, a three-dimensional area Q' narrower than three-dimensional area Q may be set as the predetermined area and display controller 43 may be configured as follows. When the bucket is in three-dimensional area Q', display controller 43 causes the display position of work assistance information 92 on display device 44 to follow the movement of bucket 7 based on the detected position of the bucket. When bucket 7 is outside three-dimensional area Q', display controller 43 does not cause the display position of the work assistance information on display device 44 to follow the movement of bucket 7.

According to the above-described configuration, the work assistance information can be caused to follow the movement of bucket 7 only in a part of the display area.

e5. Fifth Modification

While in the above description a configuration in which display device 44 displays in a display area inside opening frame 9A has been described as an example, the present invention is not limited thereto. Display device 44 may also display an inside of opening frame 9B as a display area. That is, cab 8 may be configured to include a transparent dual display. In that case, display controller 43 will control displaying in two display areas. It is also possible to provide another display device for the display area of opening frame 9B.

A work vehicle having such a configuration can also achieve an effect similar to that obtained by work vehicle 101 described above. Note that in the above case, the work assistance information can also be displayed in a display area of the lower display device.

While a hydraulic excavator has been described as an example of a work vehicle, the work vehicle is also applicable to a backhoe loader and other work vehicles.

It should be understood that the embodiments disclosed herein are illustrative and not limited to the above disclosure. The scope of the present invention is defined by the terms of the claims, and is intended to include any modifications within the meaning and scope equivalent to the terms of the claims.

REFERENCE SIGNS LIST

1: travel unit; 2, 2A, 2B: front windshield; 3: revolving unit; 4: work implement; 5: boom; 6: dipper stick; 7: bucket; 7A: teeth; 8: cab; 9: frame; 9A, 9B: opening frame; 10: manipulation device; 11L, 11R: manipulation member; 12, 12L, 12R: manipulation detector; 13: travel manipulation member; 14: travel manipulation detector; 20: work implement controller; 21: storage; 22: processor; 27: work implement control device; 30: work implement drive device; 31: proportional control valve; 40: display system; 41: bucket position detector; 43: display controller; 44, 70: display device; 71: projection device; 72: optical lens system; 73: combiner; 91, 92, 93, 94: work assistance information; 101: work vehicle; 411: bucket angle sensor; 412: dipper stick angle sensor; 413: boom angle sensor; 431: image generator; 432: display position processor; 440: display area; 441: boundary.

The invention claimed is:

1. A work vehicle comprising:
   a work implement having a bucket;
   a main body to which the work implement is attached, the main body having a cab;
   a display device provided in the cab and configured to display work assistance information to be overlaid on an actual view of a work site;
   a bucket position detector configured to detect a position of the bucket; and
   a display controller configured to control a content to be displayed on the display device, configured to cause the work assistance information to be displayed around the bucket while causing the work assistance information to follow a movement of the bucket based on the detected position, and configured to determine whether the work assistance information becomes close to a boundary of a display area of the display device due to the movement of the bucket,
   when the work assistance information is determined to become close to the boundary of the display area of the display device due to the movement of the bucket by the display controller, the display controller being configured to temporarily affix the work assistance information to a predetermined position displayed on the display device and cause the work assistance information to be continuously displayed on the display device with a relative position between the work assistance information and the bucket in the display area being changed.

2. The work vehicle according to claim 1, wherein the display controller is configured to
   cause a plurality of pieces of the work assistance information to be displayed on the display device in a predetermined arrangement, and
   change the arrangement of the plurality of pieces of the work assistance information when at least one of the plurality of pieces of the work assistance information becomes close to the boundary due to the movement of the bucket.

3. The work vehicle according to claim 1, wherein the display controller is configured to control a display position of the work assistance information on the display device such that the work assistance information is visually recognized at a left position or a right position relative to the bucket when viewed from the cab.

4. The work vehicle according to claim 3, wherein
   the bucket is movable in a frontward direction and a rearward direction relative to the cab, and when the work assistance information becomes close to the boundary due to the movement of the bucket in the rearward direction, the display controller is configured to cause the work assistance information displayed at one of the right position and the left position to be displayed at the other of the right position and the left position.

5. The work vehicle according to claim 4, wherein
the work implement is provided at a right side relative to the cab,
the one of the right position and the left position is the right position, and
the other of the right position and the left position is the left position.

6. The work vehicle according to claim 1, wherein
the bucket is movable in an upward direction and a downward direction relative to the cab, and
when the work assistance information becomes close to the boundary due to the movement of the bucket in the upward direction, the display controller is configured to change the relative position between the work assistance information and the bucket at an upper end area of the display area.

7. The work vehicle according to claim 1, wherein
the bucket is movable in an upward direction and a downward direction relative to the cab, and
when the work assistance information becomes close to the boundary due to the movement of the bucket in the downward direction, the display controller is configured to change the relative position between the work assistance information and the bucket at an lower end area of the display area.

8. The work vehicle according to claim 1, wherein the display controller is configured to determine whether the work assistance information becomes close to the boundary based on the detected position.

9. The work vehicle according to claim 1, wherein the display controller is configured to determine whether the work assistance information becomes close to the boundary based on a display position of the work assistance information.

10. The work vehicle according to claim 1, wherein the display controller is configured to determine whether the work assistance information becomes close to the boundary based on a position of an intersection between the display area and an imaginary line that connects the detected position to a reference position representing a viewpoint of an operator.

11. A display control method in a work vehicle,
the work vehicle including
a work implement having a bucket,
a main body to which the work implement is attached, the main body having a cab, and
a display device provided in the cab and configured to display work assistance information to be overlaid on an actual view of a work site,
the display control method comprising:
detecting a position of the bucket;
determining whether the work assistance information becomes close to a boundary of a display area of the display device;
displaying the work assistance information around the bucket while causing the work assistance information to follow a movement of the bucket based on the detected position; and
temporarily affix the work assistance information to a predetermined position displayed on the display device and causing the work assistance information to be continuously displayed on the display device with a relative position between the work assistance information and the bucket in the display area of the display device being changed when the work assistance information is determined to become close to the boundary of the display area.

* * * * *